SUPPRESSED CARRIER RADIO COMMUNICATION SYSTEM

Filed Dec. 1, 1949

CHALON W. CARNAHAN
*INVENTOR.*

BY [signature]

HIS AGENT

Patented Sept. 22, 1953 2,653,221

UNITED STATES PATENT OFFICE 2,653,221

SUPPRESSED CARRIER RADIO COMMUNICATION SYSTEM

Chalon W. Carnahan, Albuquerque, N. Mex., assignor to Zenith Radio Corporation, a corporation of Illinois Application December 1, 1949, Serial No. 130,547

4 Claims. (Cl. 250—6)

Figure 1:
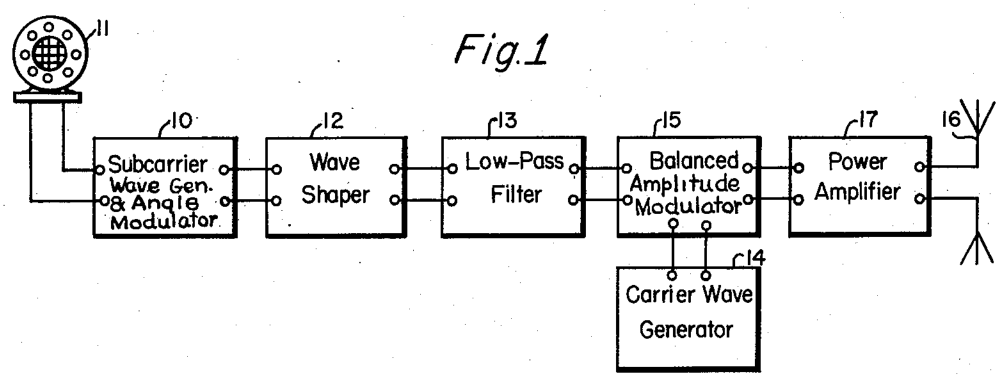

This invention relates to radio apparatus and more particularly to a novel radio broadcasting and receiving system.

It is generally recognized that frequency modulation in radio communication presents numerous advantages over amplitude modulation. For example, the use of frequency modulation results in greatly reduced interference from stations operating in the same and adjacent channels. In addition, the use of frequency modulation results in substantial reduction in interference from static and other noises as compared with that obtained with amplitude modulation. Thus, a wider audio-frequency band may be employed without excessive noise, and greater tone fidelity may be obtained, than in an amplitude modulation system. A further advantage inherent in the use of frequency modulation is that of increased transmitter efficiency. Such increased efficiency is obtainable because the total power furnished by the transmitter remains constant; in other words, an increase in sideband amplitude is accompanied by a decrease in the amplitude of the carrier-frequency component.

There are, however, disadvantages attendant on the use of frequency modulation in radio communication. One of these difficulties is that of maintaining the average carrier frequency constant, and this objective is ordinarily accomplished by the use of crystal control, automatic frequency control, or other more complicated methods. This carrier frequency control is difficult because, in order to obtain the advantage of freedom from interference, it is necessary that a relatively large bandwidth be used, and therefore the use of ultra-high frequencies for the carrier is required.

A further disadvantage of frequency modulation is that, in the receiver, the demodulator is substantially more complicated than that used in an amplitude modulation receiver, and this results in a comparatively higher manufacturing cost. Present conventional frequency modulation receivers employ, for example, a discriminator transformer in conjunction with a pair of diodes and associated load circuits to obtain frequency demodulation.

It is a primary object of the present invention to provide an improved system of radio communication which affords most of the advantages inherent in frequency modulation systems while overcoming some of the disadvantages attendant on the use of such systems.

A more specific object of the present invention is to provide a novel method of radio broadcasting wherein carrier-frequency control at the transmitter is substantially simpler than in the case of conventional frequency modulation transmitters.

A further object of the invention is to provide a novel radio transmitter in which a superaudible sub-carrier is angular-velocity modulated in accordance with the signal desired to be transmitted, and a radio-frequency carrier is amplitude modulated with the angular-velocity modulated sub-carrier in a suppressed-carrier modulator, thereby to afford transmitter efficiency comparable with that obtainable in conventional frequency modulation transmitters without encountering the serious difficulties in frequency control inherent in such conventional transmitters.

A further object of the invention is to provide an improved radio receiver for reproducing electrical signals from a modulated carrier wave having no carrier frequency component and a pair of sidebands equally spaced from the carrier frequency and each varying in frequency in accordance with the signal information.

Still another object of the invention is to provide such an improved receiver which embodies a substantially simpler demodulator than that ordinarily used in conventional frequency modulation receivers.

Still another object of the present invention is to provide an improved radio communication system which affords substantially less interference from stations operating in the same and adjacent channels, substantially less noise interference, and substantially greater tone fidelity, all with a substantially higher transmitter efficiency than may be obtained with the use of amplitude modulation.

In accordance with the present invention, a radio communication system for broadcasting and receiving electrical signals comprises a transmitter and a receiver. In the transmitter, a superaudible sub-carrier wave is angular-velocity modulated in accordance with the signals desired to be broadcast. This angular-velocity modulated sub-carrier is then used to amplitude modulate a locally generated radio-frequency carrier wave in a suppressed-carrier modulator, thereby to provide a suppressed-carrier amplitude-modulated carrier wave having sideband components which are angular-velocity modulated in accordance with the signal information. This modulated carrier wave is then radiated into space. At the receiver, the modulated carrier wave is intercepted and passed through means including an amplitude limiter to provide a converted wave having a substantially constant peak-to-peak amplitude. This converted wave is then impressed on a resonant device having a natural frequency corresponding to the carrier frequency of the converted wave to derive therefrom a modified wave which is amplitude-modulated in accordance with the signal information. An amplitude modulation detector is employed to demodulate the modified wave, thereby to reproduce the signal information.

Figure 2:
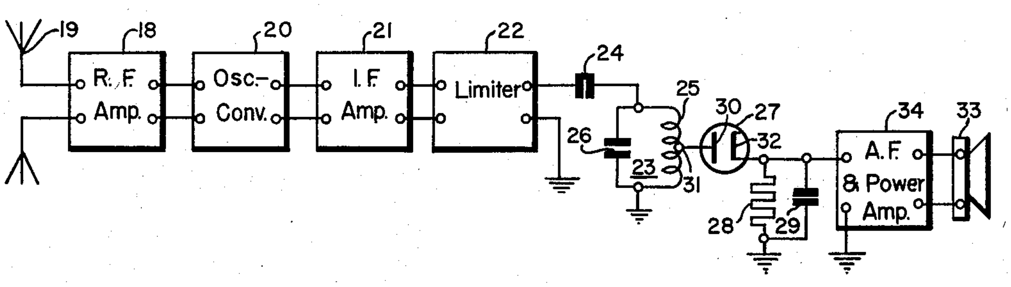

The features of the present invention which are believed to be novel are set forth with particularity in the appended claims. The invention, together with further objects and advantages thereof, may best be understood, however, by reference to the following description taken in connection with the accompanying drawing, in which:

Figure 1 is a schematic block diagram of a radio transmitter constructed in accordance with the present invention, and Figure 2 is a schematic block diagram of a radio receiver constructed in accordance with the present invention.

The transmitter shown schematically in Figure 1 comprises a sub-carrier wave generator 10 for producing a sub-carrier wave of a predetermined superaudible frequency, for example 60 kilocycles. The sub-carrier wave so generated is angular-velocity modulated in accordance with audio-frequency signal information as by means of a microphone 11 coupled thereto. The angular-velocity modulation of the sub-carrier wave preferably covers a relatively wide band, as for example from 30 to 90 kilocycles. Such a wide band angular-velocity modulated sub-carrier wave may be produced by means well known in the art; for example, a one megacycle wave may be modulated with a swing of 60 kilocycles and the resultant modulated wave may be heterodyned down to the desired frequency range. Other means for accomplishing the desired modulation may also occur to those skilled in the art.

The angular-velocity modulated output from sub-carrier wave generator 10 is passed through a squarer or wave shaper 12 to insure constant amplitude and is then passed through a low-pass filter 13, having a cut-off frequency of 90 kilocycles for the assumed example, to remove undesirable harmonic components.

A radio-frequency carrier wave, having a frequency high relative to the sub-carrier frequency, is produced in a carrier wave generator 14. The carrier frequency may be set at any desired value, for example 100 megacycles. The carrier wave from generator 14 is supplied to a suppressed-carrier type of balanced modulator 15 which is also coupled to the output of low-pass filter 13. The radio-frequency carrier wave is amplitude-modulated with the angular-velocity modulated sub-carrier wave in balanced modulator 15, and the modulated carrier wave is radiated from antenna 16 after amplification in a conventional power amplifier 17.

The receiver shown schematically in Figure 2 comprises a radio-frequency amplifier 18 the input of which is coupled to a receiving antenna 19 or other pickup device for intercepting the radiated wave. The modulated radio-frequency wave is frequency-converted in a conventional oscillator-converter stage 20, and the resulting intermediate-frequency wave, having a center frequency of 9 megacycles per second, for example, is amplified by an intermediate-frequency amplifier 21 coupled to the output of oscillator-converter 20. The amplified intermediate-frequency signal is limited to a substantially constant peak-to-peak amplitude in limiter stage 22, and the output signal of the limiter is applied to a singly resonant device 23 through a coupling condenser 24. Resonant device 23 is shown as comprising a single passive oscillatory circuit consisting of a parallel arrangement of an inductor 25 and a condenser 26, although other singly resonant devices of high quality factor or Q may be employed. Resonant device 23 has a natural frequency corresponding to the center frequency of the intermediate-frequency signal.

An amplitude-modulation detector, comprising a diode 27 or other unilaterally conducting device and a load circuit including a resistor 28 shunted by a condenser 29, is coupled to resonant device 23. Specifically, in the illustrated arrangement, the anode 30 of diode 27 is connected to a tap 31 on inductor 25. The cathode 32 of diode 27 is connected to ground through the parallel arrangement or resistor 28 and condenser 29. Audio-frequency output potentials appearing across resistor 28 are applied to a signal-reproducing device or loudspeaker 33 after amplification in the usual audio-frequency and power amplifier stages 34.

In operation, when the angular-velocity modulated sub-carrier wave is amplitude modulated on the radio-frequency carrier wave in the suppressed-carrier type of balanced modulator 15 of the transmitter of Figure 1, the resulting signal comprises a suppressed-carrier amplitude-modulated carrier wave having a pair of sideband components which are each angular-velocity modulated in accordance with the signal information. Since the radio-frequency carrier is not itself angular-velocity modulated, the problem of frequency control is much less troublesome than that encountered in conventional frequency modulation transmitters. At the same time, however, the advantage of high transmitter efficiency is accomplished, by virtue of the fact that the total power radiated by the transmitter remains constant.

In the receiver of Figure 2, radio-frequency amplification and frequency-conversion are effected in the usual manner in stages 18 and 20, and a suppressed-carrier intermediate-frequency signal having a pair of sideband components which are each angular-velocity modulated in accordance with the signal information appears at the output of intermediate-frequency amplifier 21. Amplitude limiter 22 operates to eliminate undesired extraneous noise components and to provide a limited wave of substantially constant peak-to-peak amplitude which is then impressed on resonant device 23.

Resonant device 23 is tuned to a frequency corresponding to the receiver intermediate-frequency. Since this frequency is suppressed in the signal applied to resonant device 23, no intermediate-frequency component is supplied to diode 27. However, the signal applied to resonant device 23 does comprise the two sideband components each of which is angular-velocity modulated in accordance with the signal information. The center-frequencies of these sideband components are respectively spaced on opposite sides of the intermediate-frequency by an amount corresponding to the sub-carrier wave center-frequency. The quality factor or Q of resonant device 23 is adjusted so that the center-frequency of each sideband component occurs at substantially the center of the most linear portion of the response curve of device 23. Consequently, the voltage appearing between tap 31 and ground, which is applied to diode 27, varies in amplitude in accordance with the instantaneous frequency variation of the side band components; since the sideband components are impressed on portions of the resonance curve of opposite slopes, the contributions of both sideband components are additive in the output.

Thus, the output appearing between tap 31 and ground is a modified wave which is essentially analoguos to an amplitude-modulated intermediate-frequency carrier wave.

The output from resonant device 23 is impressed on diode 27 which functions together with resistor 28 and condenser 29 as a conventional amplitude-modulation detector. The audio-frequency output appearing across resistor 28 and condenser 29 is applied to loudspeaker 33 after amplification in stages 34.

Purely by way of illustration, and in no sense by way of limitation, it may be desirable to set forth a specific example of an operative system constructed in accordance with the invention. If the intermediate-frequency of the receiver is 9 megacycles, and the frequency swing of the angular-velocity modulated sub-carrier wave at the transmitter is from 30 to 90 kilocycles, and if the limiting level of amplitude limiter 22 at the receiver is assumed to be 1 volt, an audio-frequency output, appearing across resistor 28, of 1.25 volts R. M. S. may be obtained with the following circuit components:

Device 23—A parallel resonant circuit having a Q of 75 and tuned to a frequency of 9 megacycles.

Resistor 28—100,000 ohms.

Condenser 29—100 micro-microfarads.

Since the desired signal is angular-velocity modulated on the sub-carrier, the basic advantages of frequency modulation are obtained. Because a suppressed-carrier modulator is used at the transmitter, a simple tuned circuit and a conventional amplitude modulation detector may be utilized in the receiver in place of the usual discriminator transformer and double-diode detector conventionally used in frequency modulation receivers.

It is contemplated that the system may be adapted to single sideband transmission and reception by providing a filter at the transmitter for passing only one of the angular-velocity modulated sidebands; the receiver as illustrated is operative for either single sideband or double sideband reception. As a further modification, the receiver may be of the tuned-radio-frequency type, in which event the resonant device 23 preceding the detector is tuned to a frequency corresponding to that of the suppressed-carrier component of the incoming signal.

While a particular embodiment of the present invention has been shown and described, it is apparent that various changes and modifications may be made, and it is therefore contemplated in the appended claims to cover all such changes and modifications as fall within the true spirit and scope of the invention.

I claim:

1. A radio communication system for broadcasting and receiving electrical signals comprising: a first oscillation generator for producing a sub-carrier wave of predetermined superaudible frequency; means for angular-velocity modulating said sub-carrier wave in accordance with said signals; a second oscillation generator for producing a carrier wave of a radio-frequency which is high relative to said sub-carrier frequency; a suppressed-carrier amplitude modulator coupled to said generators for amplitude modulating said carrier wave with said angular-velocity modulated sub-carrier wave to provide a suppressed-carrier amplitude-modulated carrier wave having sideband components which are angular-velocity modulated in accordance with said signals; means for radiating said modulated carrier wave into space; means for intercepting said radiated wave; means including an amplitude limiter for converting said intercepted wave to a modulated wave having a substantially constant peak-to-peak amplitude; a resonant device coupled to said limiter and having a natural frequency corresponding to the carrier frequency of said converted wave for deriving therefrom a modified wave which is amplitude modulated in accordance with said signals; and an amplitude-modulation detector coupled to said resonant device for demodulating said modified wave.

2. A radio receiver comprising: a source of a suppressed-carrier amplitude modulated carrier wave having a sideband component which is angular-velocity modulated in accordance with intelligence signals; means including an amplitude limiter for converting said wave to a modulated wave having a substantially constant peak-to-peak amplitude; only one singly resonant device coupled to said limiter and having a natural frequency corresponding to the carrier frequency of said converted wave for deriving therefrom a modified wave which is amplitude modulated in accordance with said signals; and an amplitude-modulation detector coupled to said resonant device for demodulating said modified wave.

3. A radio receiver comprising: a source of a suppressed-carrier amplitude modulated carrier wave having a side band component which is angular-velocity modulated in accordance with intelligence signals; means including an amplitude limiter for converting said wave to a modulated wave having a substantially constant peak-to-peak amplitude; only one passive oscillatory circuit coupled to said limiter and tuned to a frequency corresponding to the carrier frequency of said converted wave for deriving therefrom a modified wave which is amplitude modulated in accordance with said signals; and an amplitude-modulation detector coupled to said oscillatory circuit for demodulating said modified wave.

4. A superheterodyne radio receiver comprising: a source of a suppressed-carrier amplitude modulated carrier wave having a sideband component which is angular-velocity modulated in accordance with intelligence signals; heterodyne means for frequency-converting said modulated carrier wave; an amplitude limiter for limiting said frequency-converted wave to a substantially constant peak-to-peak amplitude; only one parallel-resonant circuit coupled to said limiter and having a natural frequency corresponding to the carrier frequency of said converted wave for deriving therefrom a modified wave which is amplitude modulated in accordance with said signals; and an amplitude-modulation detector coupled to said resonant device for demodulating said modified wave.

CHALON W. CARNAHAN.

References Cited in the file of this patent

UNITED STATES PATENTS

| Number | Name | Date |
|---|---|---|
| 1,548,895 | Mertz | Aug. 11, 1925 |
| 2,095,050 | Beverage | Oct. 5, 1937 |

| Number | Name | Date |
|---|---|---|
| 2,152,515 | Wheeler | Mar. 28, 1939 |
| 2,237,522 | Clark | April. 8, 1941 |
| 2,259,891 | Hunt | Oct. 21, 1941 |
| 2,273,144 | Roberts | Feb. 17, 1942 |
| 2,283,575 | Roberts | May 19, 1942 |
| 2,379,748 | Roberts | July 3, 1945 |
| 2,407,308 | Lorenzen at al. | Sept. 10, 1946 |
| 2,445,618 | Hutcheson | July 20, 1948 |